No. 666,086. Patented Jan. 15, 1901.
J. W. CRUIKSHANK.
GLASS TEEMING APPARATUS.
(Application filed May 17, 1900.)

(No Model.)

WITNESSES

INVENTOR

UNITED STATES PATENT OFFICE.

JAMES W. CRUIKSHANK, OF OAKMONT, PENNSYLVANIA.

GLASS-TEEMING APPARATUS.

SPECIFICATION forming part of Letters Patent No. 666,086, dated January 15, 1901.

Application filed May 17, 1900. Serial No. 16,993. (No model.)

*To all whom it may concern:*

Be it known that I, JAMES W. CRUIKSHANK, of Oakmont, in the county of Allegheny and State of Pennsylvania, have invented a new and useful Improvement in Glass-Teeming Apparatus, of which the following is a full, clear, and exact description, reference being had to the accompanying drawings, forming part of this specification, in which—

Figure 1:
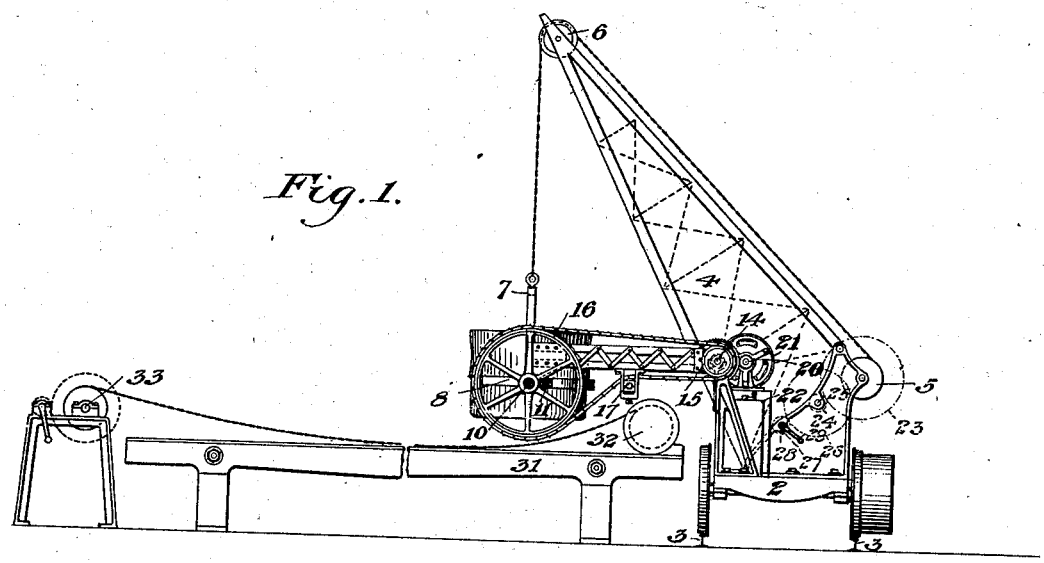
Figure 2:
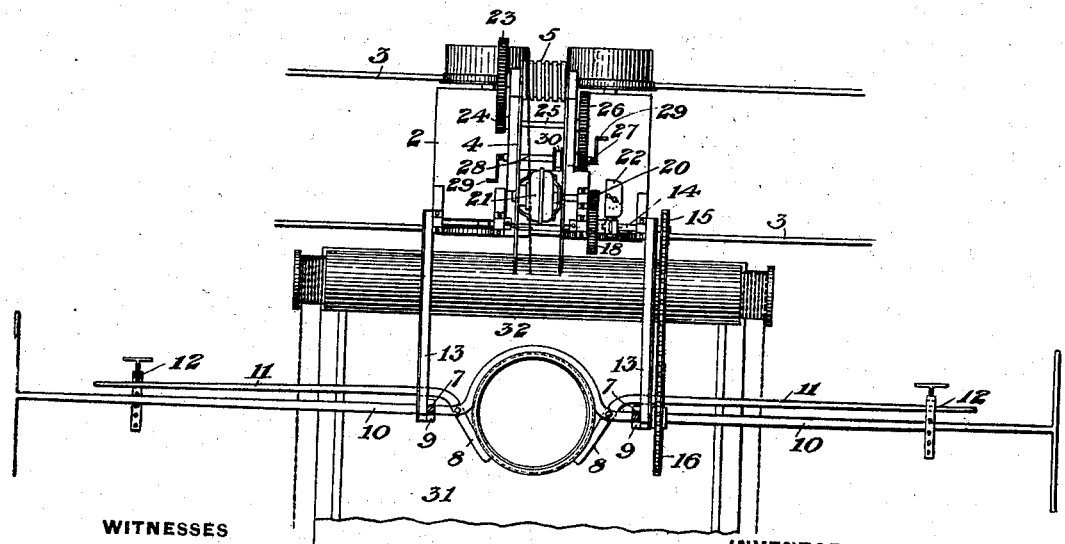

Figure 1 is a sectional side elevation of my improved apparatus in position above the table for rolling plate-glass, and Fig. 2 is a cross-section taken just above the top of the pot.

My invention relates to the teeming of glass from pots upon the table where the glass is rolled into sheets or plates, and is designed to provide improved power-actuated mechanism by which the hand labor heretofore necessary for this step is done away with.

In the drawings, 2 represents a car movable upon a track 3 and having mounted thereon an inclined crane 4, provided with a hoisting-chain extending from drum 5 over the top pulleys 6 and thence down to the bail 7 of the pot-carrying tongs 8. This bail is secured to trunnions 9 on a fixed arm 10 of the tongs, the other arms 11 11 of the tongs being pivoted to the main arm and held in position by clamps 12, embracing the arms. The rear wheels of the car 2 are provided with wide flanges which act as counterweights to balance the pot and mechanism. Struts 13 13 are secured to bearings surrounding the trunnions of the main arm of the tongs and at the rear are pivoted about a common shaft 14, which carries a sprocket wheel or sheave 15, from which a chain or rope extends over a large sprocket wheel or sheave 16, keyed or otherwise fastened to the main arm of the tongs, the chain passing over a guide-wheel 17 in the lower portion of its path. The shaft 14 has clutch connection with a sleeve carrying a toothed wheel 18, meshing with a pinion 20 upon a shaft to which the rotating armature of an electric motor is secured, this shaft preferably having a friction-brake. The motor is controlled by the usual rheostat or controller 22.

The drum 5, upon which is wound the hoisting-chain, has a shaft provided with a toothed wheel 23, intermeshing with a pinion 24 upon shaft 25, having wheel 26 intermeshing with pinion 27 upon the shaft 28. The shaft 28 is provided with suitable actuating levers or handles 29 and with a brake-wheel 30, by which the pot may be held at any elevation to which it is moved.

The usual casting-table 31 is used, having the roller 32, actuated from shaft 33, provided with a drum and train of gears and having chain connection with the roller to draw it over the table.

In operating my apparatus the pot is taken from the melting-furnace by suitable means and deposited convenient to the table, where the teeming-tongs are placed around it and clamped, as shown. The tongs and pot are then raised to the proper elevation and the truck is moved along to the proper position opposite the table. The electric motor then being actuated through any suitable source of electrical energy turns the tongs and the pot held therein and holds it in the desired position by the friction-brake and teems or pours the hot glass upon the table. While the glass is being thus teemed, the truck is moved transversely of the table, so as to evenly distribute the glass upon this table. When near the far side of the table, the motor is reversed, and the tongs carrying the pot, aided by gravity, tilt back suddenly into the normal position. In raising or lowering the pot upon the crane the clutch connection with the motor is disconnected to prevent any turning of the pot during such lifting or lowering. In removing the pot from the tongs it is lowered upon a raised stand or platform, which allows the actuating-wheel to pass down upon one side of it.

The advantages of my invention result from the use of an electric motor having actuating connections for turning the tongs to teem the glass, since the operation is thereby under the complete control of the attendant, who without any manual labor can tilt the pot to any desired position or stop the teeming at any desired moment, and may thus have the operation under perfect control without the use of men at the lever ends 34 of the teeming-tongs. This teeming operation has heretofore called for a high class of skilled labor, as at least one of the teemers must possess large experience in order to get the proper distribution and properly control the flow. By my invention I dispense with this highly-skilled operator and also several other attendants, the whole operation being under the charge of one man.

Many changes may be made in the form and arrangement of the motor, the mounting and carrying of the tongs or the clamping device, and the actuating connections without departing from my invention.

I claim—

1. The combination with tongs arranged to clamp a pot of glass therein, of a supporting-bail connected with the tongs, means to raise and lower the same, and an electric motor having actuating connections with the tongs arranged to turn them; substantially as described.

2. In glass-teeming apparatus, the combination with tongs arranged to hold a pot of glass, of a wheel secured to one arm of the tongs, mechanism for raising and lowering the tongs, and an electric motor having chain connection with the wheel; substantially as described.

3. In glass-teeming apparatus, a crane having a bail secured to tongs, pivoted struts extending from the crane to the tongs, a wheel upon the tongs, a shaft having the same axis as the pivot of the struts, a flexible connection between said wheel and shaft, and an electric motor arranged to rotate said shaft; substantially as described.

4. The combination with tongs arranged to hold a pot of glass and provided with oppositely-extending arms, of supporting mechanism engaging the arms on opposite sides of the pot, and actuating connections arranged to turn the tongs to teem the glass; substantially as described.

In testimony whereof I have hereunto set my hand.

JAMES W. CRUIKSHANK.

Witnesses:
 T. W. BAKEWELL,
 CHAS. C. BITTNER.